(12) United States Patent
Locker et al.

(10) Patent No.: US 8,620,291 B2
(45) Date of Patent: Dec. 31, 2013

(54) APPARATUS, SYSTEM, AND METHOD FOR DIGITAL VOICE CALL REDIRECTION

(75) Inventors: Howard J. Locker, Cary, NC (US); David Carroll Challener, Raleigh, NC (US); Daryl C. Cromer, Cary, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 381 days.

(21) Appl. No.: 12/751,616

(22) Filed: Mar. 31, 2010

(65) Prior Publication Data

US 2011/0244841 A1  Oct. 6, 2011

(51) Int. Cl.
*H04M 3/42* (2006.01)
(52) U.S. Cl.
USPC .......................................... 455/417; 370/338
(58) Field of Classification Search
USPC .......................................... 455/417; 370/338
See application file for complete search history.

(56) References Cited

U.S. PATENT DOCUMENTS

| | | | |
|---|---|---|---|
| 2002/0160762 A1* | 10/2002 | Nave et al. | 455/414 |
| 2006/0223511 A1* | 10/2006 | Hagale et al. | 455/417 |
| 2007/0281703 A1* | 12/2007 | Shkedi | 455/445 |
| 2010/0115106 A1* | 5/2010 | Moriwaki et al. | 709/227 |

* cited by examiner

*Primary Examiner* — Marcos Batista
(74) *Attorney, Agent, or Firm* — Kunzler Law Group (57) ABSTRACT

Apparatus, systems, and methods provide digital voice call redirection. A configuration module associates a phone number with a first identifier of a first voice terminal device and a second identifier of a second voice terminal device provided by an address module. A location module determines whether the first device is within a predefined proximity to the second device, such as by detecting connectivity between the devices, over a personal area network ("PAN"). A routing module redirects a digital voice call to a call module of the first device using the first identifier when the first device is not within the predefined proximity to the second device. Otherwise the routing module directs the call to a call module of the second device using the second identifier.

25 Claims, 8 Drawing Sheets

APPARATUS, SYSTEM, AND METHOD FOR DIGITAL VOICE CALL REDIRECTION

BACKGROUND

1. Field of the Invention

This invention relates to digital voice systems and more particularly relates to digital call routing.

2. Description of the Related Art

In recent years there has been a trend toward convergence between computing and communications technology. The distinction between traditional devices such as telephones and computers has become increasingly blurred as analog telephony has given way to packet-switched digital technology, cell phones have become "smarter" and computers have acquired Internet-based virtual phone capabilities.

Although this abundance of telephonic technology has brought many advantages, it also creates a problem of determining which telephonic device would be the most appropriate one to communicate with a given user at a given moment. In a sense, the convergence of technology has created a divergence of complementary solutions that must now be more intelligently managed in order to fully realize their potential.

SUMMARY

From the foregoing discussion, it should be apparent that a long-felt unmet need exists for an apparatus, system, and method to redirect digital voice calls among the multiple phones or voice-capable devices belonging to a given user. Beneficially, such an apparatus, system, and method would automatically detect which device would be the most appropriate to accept a call under the dynamic conditions then prevailing.

The present apparatus, system and method have been developed in response to the present state of the art, and in particular, in response to the problems and needs in the art that have hitherto proven intractable under currently available digital call routing. Accordingly, the present apparatus, system, and method for digital voice call redirection overcome many or all of the above-discussed shortcomings in the art.

An apparatus for digital voice call redirection is provided with a plurality of modules configured to functionally execute the steps of providing a first identifier of a first voice terminal device to be associated with a phone number, making a determination as to whether the first device is within a predefined proximity to a second voice terminal device, and accepting a digital voice call to any one of a plurality of devices associated with the phone number. The call is redirected to the first device using the first identifier when the first device is not within the predefined proximity to the second device. These modules in the described embodiments include an address module that provides the identifier, a location module that makes the determination, and a call module that accepts the redirected call.

The apparatus, in one embodiment, may predefine proximity as the existence of connectivity between the first device and second device over a PAN. In a further embodiment, the PAN may be wireless, such that the predefined proximity comprises being within transmission range.

A system is also presented to redirect digital voice calls. The system may be embodied by the foregoing apparatus plus a configuration module that associates the first identifier of the first device provided by the address module with the phone number, and a routing module that receives the determination made by the location module and redirects the digital voice call to the call module of the first device using the first identifier when the first device is not within the predefined proximity to the second device.

In particular, the system, in one embodiment, may predefine proximity as being within transmission range of a wireless PAN. The wireless PAN may comprise any of a number of short-range wireless protocols, using radio or any other type of electromagnetic transmission. Examples of such protocols include Bluetooth, Wireless Fidelity ("WiFi"), Infrared Data Association ("IrDA"), Ultra Wide Band ("UWB"), Z-Wave, ZigBee, and so forth. The identifier of the devices may comprise an Internet Protocol ("IP") address, a cell phone electronic serial number ("ESN"), or the like The system is further configured, in one embodiment, with the first device of a pair being more portable than the second device. For example, the first device may be a cell phone, a personal digital assistant ("PDA"), a notebook computer, or the like, and the second device may be a desk phone, a desktop computer, a notebook computer which may be used as a desktop replacement, and so forth.

In another embodiment, the first device may be a computer with a virtual phone capability and the second device may a physical phone that provides a higher quality user experience than the virtual phone. For example, the first device may be a notebook computer, a PDA, or the like, and the second device may be a desk phone, a cell phone, and so forth. In a further embodiment, the location module of system may be operationally coupled at least in part to the first device, since as a computer it may be better suited to the task of making the determination of proximity than the second device.

The system may further include a digital voice server, and the configuration module and routing module may be operationally coupled at least in part to the server. In a further embodiment, the location module may also be operationally coupled at least in part to the server, using GPS technology, cellular location tracking, or the like, or a combination thereof, to locate the first and second devices and thereby determine their proximity to one another.

In an embodiment, the first device and the second device may comprise a pair selected from among a plurality of devices associated with the phone number, and the determination may be made repeatedly in a pair-wise iterative fashion, pairing a device selected by a prior determination with another device not yet rejected by another prior determination from among the plurality of devices, to make a subsequent determination until a single device emerges from among the plurality of devices to accept the call A method is also presented for digital voice call redirection. The method in the disclosed embodiments substantially includes steps to carry out the functions presented above with respect to the operation of the described apparatus and system. In one embodiment, the method includes providing the first identifier of the first device, making a determination as to whether the first device is within a predefined proximity to the second device, and accepting the call as redirected to the first device. The method also may include associating the first identifier with the phone number, the phone number also being associated with the second identifier, receiving the call to any one of a plurality of devices associated with the phone number, and redirecting the call to the first device using the first identifier when the first device is not within the predefined proximity to the second device.

In a further embodiment, the first device may be assumed to be within the predefined proximity to the second device if the determination is unsuccessful. For example, the determination may be deemed unsuccessful if it is not made within a predefined time interval before receiving the call. Such could be the case if the first device is shut down or otherwise non-operational. Thus if a time-stamp of the determination has lapsed, or the server simply cannot communicate with the first device at all, then the call is routed to the second device.

These features will become more fully apparent from the following description and appended claims, or may be learned by the practice of the embodiments as set forth hereinafter.

BRIEF DESCRIPTION OF THE DRAWINGS

A more particular description will be rendered by reference to specific embodiments that are illustrated in the appended drawings. Understanding that these drawings depict only typical embodiments and are not therefore to be considered to limit the scope of the claims, the embodiments will be described and explained with additional specificity and detail through the use of the accompanying drawings, in which:

DETAILED DESCRIPTION

Reference throughout this specification to features, advantages, or similar language does not imply that all of the features and advantages that may be realized hereby should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the present apparatus, system and method may be practiced without one or more of the specific features or advantages of a particular embodiment. In other instances, additional features and advantages may be recognized in certain embodiments that may not be present in all embodiments.

Many of the functional units described in this specification have been labeled as modules, in order to more particularly emphasize their implementation independence. A module may comprise utilitarian objects of any kind, including mechanical structures or devices, electrical devices, electro-mechanical devices, optical devices, analog electronics, digital electronics, and so forth. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or any other form of digital processing apparatus memory device.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that the apparatus, system and method may be practiced without one or more of the specific details, or with other methods, components, materials, and so forth. In other instances, well-known structures, materials, or operations are not shown or described in detail to avoid obscuring aspects thereof.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

One approach is for a user's portable virtual phone to have a capability of determining whether is it is near to the user's less portable physical phone. For example, close proximity could be deduced if the virtual phone is able to determine that the physical phone is within range of the user's personal area network ("PAN"). Since the user is likely to have the portable virtual phone on or near his person, if it is close to the physical phone that implies that the user is also close to the physical phone. In that case, calls are directed to the physical phone, which may be better optimized for voice communications than the virtual phone. However, if the virtual phone is not close to the physical phone, then calls are directed to the virtual phone since it is most likely more accessible to the user in that case.

Another approach is to deduce the proximity of the phones by comparing their absolute locations, as determined by a global positioning system ("GPS") or the like. This approach may be implemented remotely on a digital voice server, which may be advantageous if neither phone is computationally versatile ("smart") enough to implement the former approach.

Figure 1:
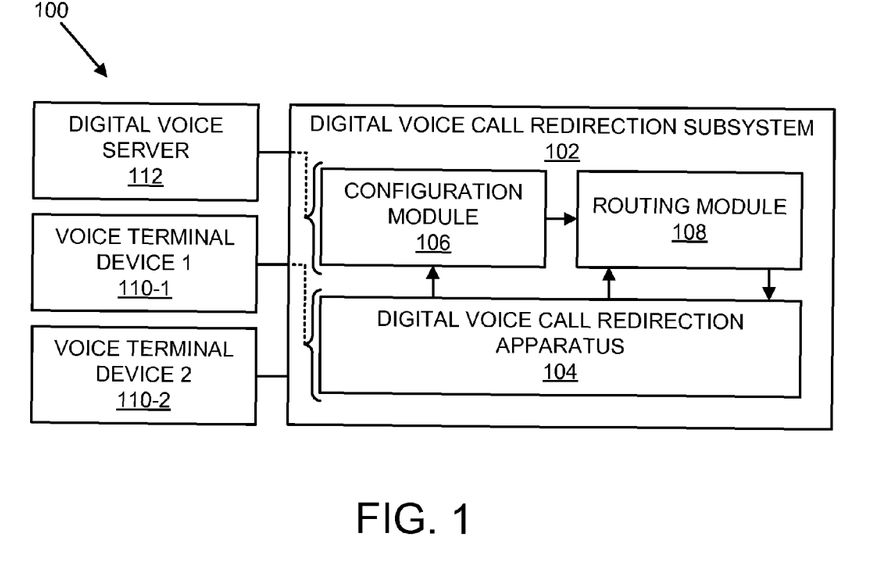
FIG. 1 is a schematic block diagram illustrating a digital voice call redirection system.

FIG. 1 is a schematic block diagram illustrating a system 100 comprising a digital voice call redirection subsystem 102, voice terminal devices 110-1, 110-2 (hereinafter collectively referred to as "110"), and a digital voice server 112. The subsystem 102 comprises a digital voice call redirection apparatus 104, a configuration module 106, and a routing module 108. In alternative embodiments, the modules of the apparatus 104 may be operationally coupled at least in part to one or more of the devices 110, and the configuration module 106 and routing module 108 may be operationally coupled at least in part to the server 112.

The configuration module 106 associates voice terminal device identifiers provided by the apparatus 104 with a phone number belonging to a user. A first identifier of the first device 110-1 may be associated with the same phone number as a second identifier of the second device 110-2. It should be understood that the devices 110 may be representative of additional similar pairs of devices, though not explicitly shown in the figure.

The routing module 108 redirects a digital voice call to the first device 110-1 using the first identifier from the configuration module 106 when the first device 110-1 is not within a predefined proximity to the second device 110-2. As used herein, the term "proximity" denotes physical proximity, but may be determined according to one or more related criteria such as a cable length, a wireless transmission range, a bounded difference in location coordinates, and so forth.

The first device 110-1 is generally preferred in this instance because the first device 110-1 is the one more likely to be accessible to the user. Otherwise, the routing module 106 directs the call to the second device 110-2 using the second identifier, because the second device 110-2 is the preferred one when both devices 110 are equally accessible to the user. In certain embodiments, the user may be able to dynamically specify which device 110 of any given pair is the first device 110-1 and which device is the second device 110-2.

In a further embodiment, if more than two devices 110 share the same phone number, then the routing module 108 may handle them iteratively in pair-wise fashion until a single device 110 emerges as the one to accept the call. For example, if there are three devices 110, any two of the devices 110 may be treated as a first pair by the routing module 108 to select one of those two devices 110. Then the selected device 110 from the first pair and the remaining third device 110 may be treated as a second pair by the routing module 108 to make a final selection.

Figure 2:
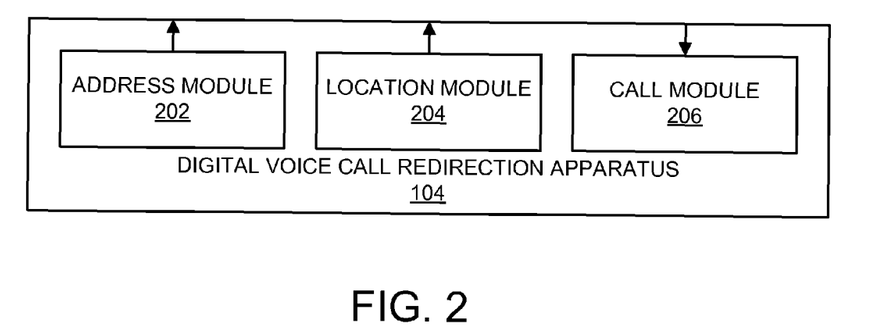
FIG. 2 is a schematic block diagram illustrating a digital voice call redirection apparatus.

FIG. 2 is a schematic block diagram illustrating the digital voice call redirection apparatus 104, comprising an address module 202, a location module 204, and a call module 206. The address module 202 provides the identifier of the device 110 to the configuration module 106. The location module 204 makes a determination as to whether the first device 110-1 is within a predefined proximity to the second device 110-2. That determination is then used by the routing module 108 in the manner described above to direct or redirect the call to the call module 206 of the appropriate device 110.

In one embodiment, the first device 110-1 may be more portable than the second device 110-2. As used herein, "more portable" is intended to mean that it is preferred by a user for its portability characteristics. For example, a more portable device may be more compact in size, it may be capable of running on battery power as opposed to requiring an electric outlet, it may have a wireless communication capability in addition to or instead of a wired connection only, it may be foldable, it may be provided with a carrier such as a holster or pack, and so forth. Thus, if the user changes location, the user is more likely to take along the first device 110-1 than the second device 110-2.

In another embodiment, the first device 110-1 may be a computer with a virtual phone capability and the second device 110-2 may a physical phone that provides a higher quality user experience than the virtual phone. Specifically, with a physical phone, the call connection may be more reliable, the audio quality may be higher, the form factor may be more ergonomic in terms of a dedicated keypad and shape that conforms to the user's mouth and ear, the underlying dedicated platform may be more rugged and available than a multi-tasking platform like a computer that can malfunction or be shut down and may be more easily damaged, and so forth. Thus, if the user has both devices accessible in the same general location, the user is more likely to prefer the second device 110-2 than the first device 110-1.

In a further embodiment, the location module 204 may be operationally coupled at least in part to the first device 110-1, if as a computer it may be better suited to the task of making the determination of proximity than the second device 110-2. For example, the predefined proximity may comprise connectivity over a personal area network ("PAN"). If the location module 204 in the first device 110-1 is able to connect via the PAN with the second device 110-2, then that implies that the two devices 110 are within the predefined proximity of one another, as defined by a maximum cable length if it is a wired PAN, or a maximum transmission range if is a wireless PAN.

The rationale behind this criteria is that both devices 110 would therefore be within the personal space of the user and therefore equally accessible.

The wired PAN may comprise protocols such as Universal Serial Bus ("USB"), Firewire, or the like. The wireless PAN may comprise any of a number of short-range wireless protocols, using radio or any other type of electromagnetic transmission. Examples of such protocols include Bluetooth, Wireless Fidelity ("WiFi"), Infrared Data Association ("IrDA"), Ultra Wide Band ("UWB"), Z-Wave, ZigBee, and so forth.

In another embodiment, the location module 204 may operationally coupled at least in part to the server 112. For example, if the absolute location of each device 110 can be determined, such as by global positioning system ("GPS") technology or cellular location technology, then a location database may be maintained on the server 112. The location module 204 may then query the database and compare the location of the first device 110-1 with that of the second device 110-2 to make the determination whether the devices 110 are within the predefined proximity of one another, as defined by a maximum absolute distance between them, most likely being commensurate with the personal space of a PAN as in the previous embodiment.

Figure 3:
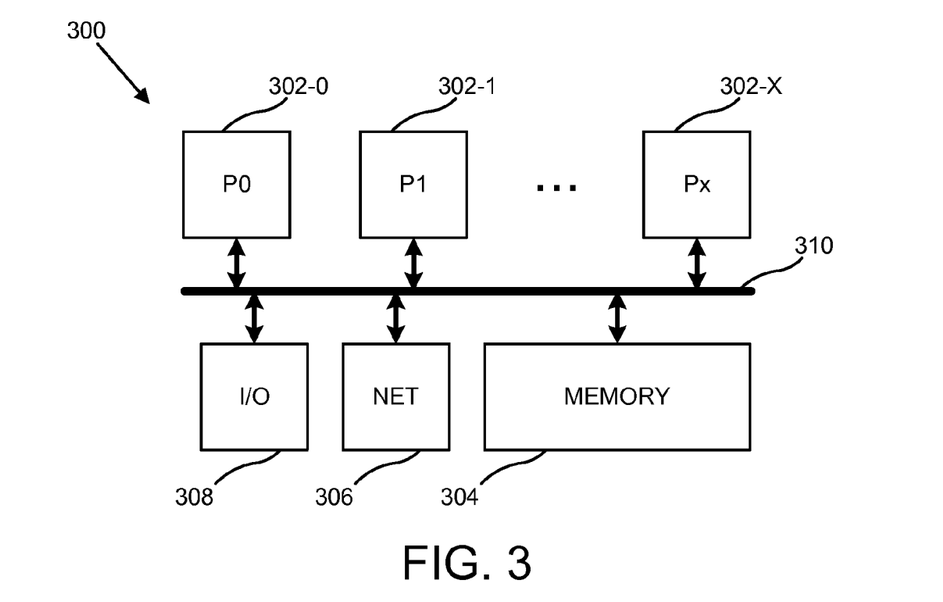
FIG. 3 is a schematic block diagram illustrating a computer hardware platform upon which embodiments may be at least in part deployed.

FIG. 3 illustrates a possible computer hardware platform 300 with which the present apparatus, system and method may be at least in part implemented. The hardware platform 300 may include processor(s) 302, memory 304, a network interface 306, and an I/O (Input/Output) device interface 308, connected through a bus 310.

The hardware platform 300 may be of any form factor or type, including an embedded system, a handheld, a notebook, a personal computer, a minicomputer, a server, a mainframe, a supercomputer, and the like.

The processor(s) 302 may be present in any quantity, including a uniprocessor, and may have any instruction set architecture. In an embodiment, the processor(s) 302 may have one or more levels of dedicated or shared caches. Possible physical implementations may include multi-chip, single chip, multi-core, hyperthreaded processors, and the like.

The memory 304 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 306 may support any network protocol or architecture. It may support both wireless and hard-wired network connections. It may comprise Ethernet or 802.11abgn, and the like. In one embodiment, it may be integrated with the I/O device interface 308.

The I/O device interface 308 may be driven primarily by the processor(s) 302 or may incorporate an independent I/O processor subsystem. It may comprise Serial Advanced Technology Attachment ("SATA"), Peripheral Component Interconnect ("PCI"), Small Computer System Interface ("SCSI"), Serial Attached SCSI ("SAS"), Fiberchannel ("FC"), Enterprise System Connection ("ESCON"), ESCON over Fiberchannel ("FICON"), and the like. In an embodiment, it may include dedicated local I/O devices.

The bus 310 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 310 may comprise a high-speed internal network.

Figure 4:
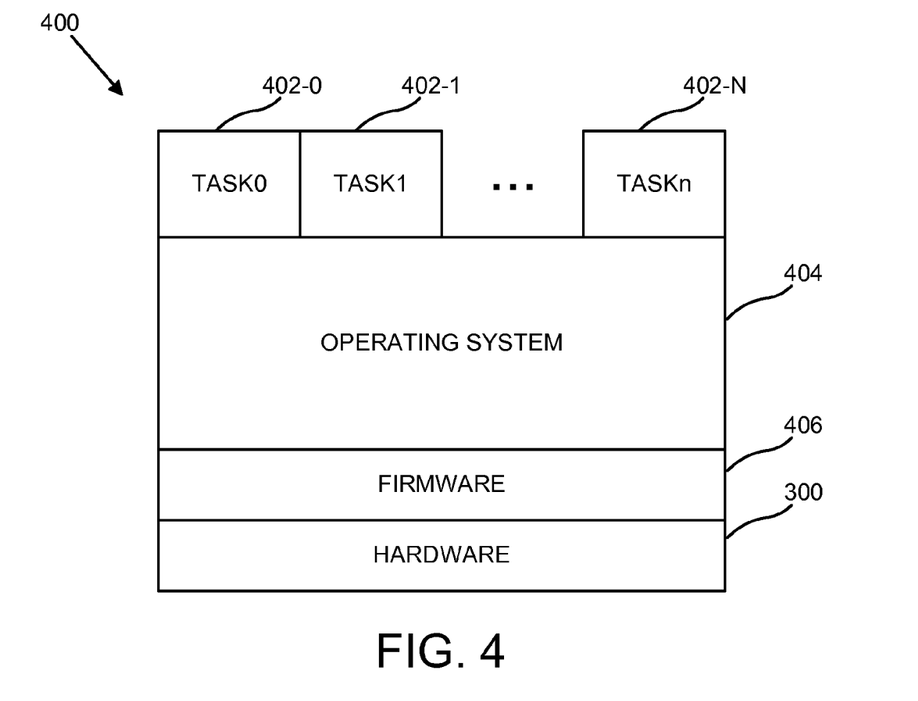
FIG. 4 is a schematic block diagram of a computer including a software stack to which embodiments may at least in part be operationally coupled.

FIG. 4 is a diagram of a possible computer 400 including a software stack in which embodiments may at least in part be implemented. The software stack may include task(s) 402, hosted on an operating system 404, enabled by firmware 406, running on a hardware platform 300 of which the configuration of FIG. 3 is representative.

The task(s) 402 may include both user- and system-level tasks. They may be interactive or batch. They may run in the foreground or background. User-level task(s) 402 may include applications, programs, jobs, middleware, and the like. System-level task(s) 402 may include services, drivers, daemons, utilities, and the like.

The operating system 404 may be of any type and version and in any state. Types may include Unix, Linux, Windows, Mac, MVS, VMS, and the like. Versions may include Windows XP, Windows 7, and the like. States may include a degree of customization, a mode of operation, a system preparation for setup, and the like. The operating system 404 may be single-user or multi-user. It may be single-tasking or multi-tasking. In an embodiment, the operating system 404 may be real-time. In another embodiment, the operating system 404 may be embedded.

The firmware 406 may comprise microcode, which may operationally coupled to a microstore of the processor(s) 302. In an embodiment, the firmware 406 may comprise low-level software, which may be operationally coupled to memory 304. In one embodiment, the firmware 406 may comprise a rudimentary operating system 404. In a further embodiment, the firmware 406 may support virtualization so as to permit the concurrent operation of multiple operating systems 404 on a hardware platform 300.

Figure 5:
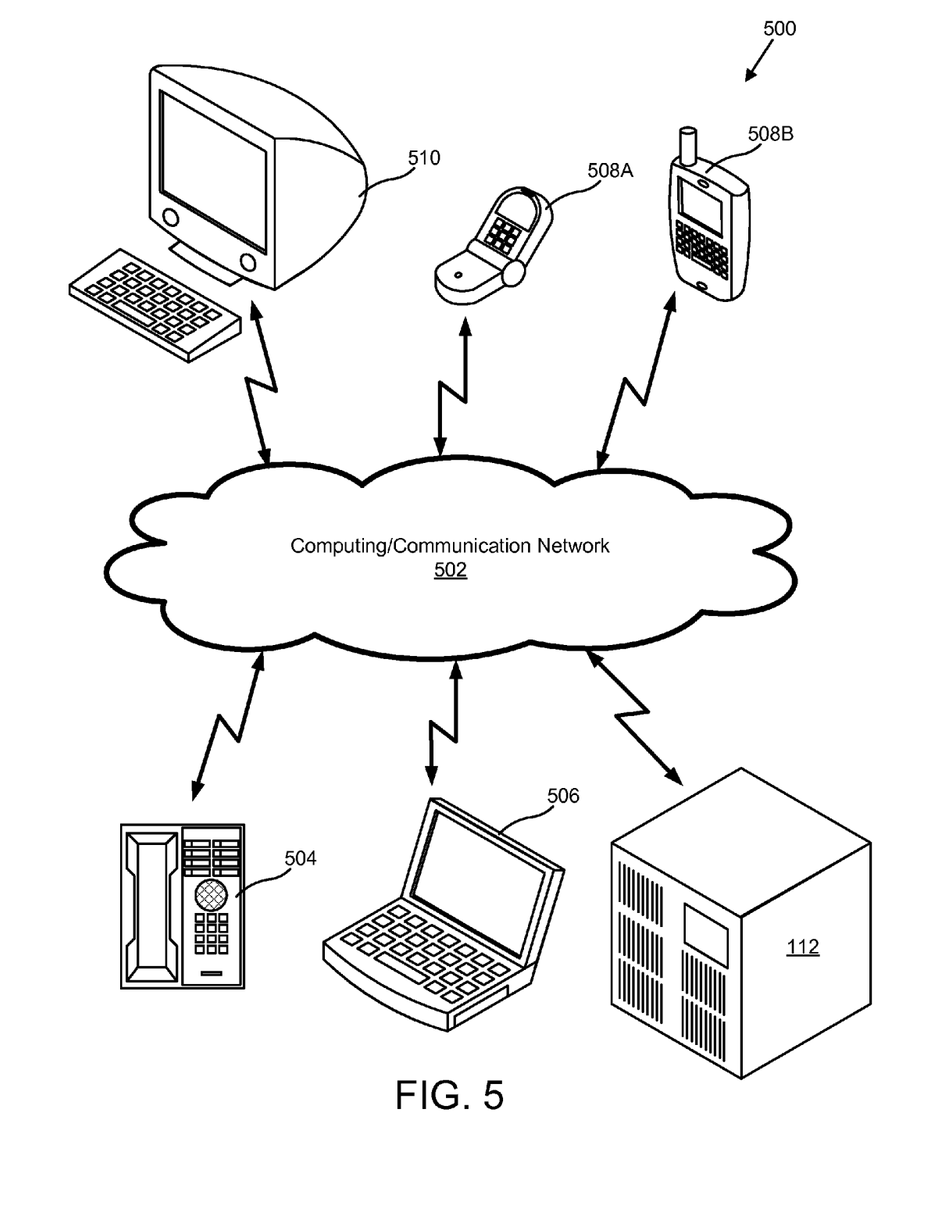
FIG. 5 is a schematic block diagram illustrating a digital voice network.

FIG. 5 is a schematic block diagram illustrating a digital voice network 500 having a network infrastructure 502 connecting the digital voice server 112 and various embodiments of voice terminal devices 110. The server 112 may comprise a computer 400. The network infrastructure 502 may comprise one or more of a local area network ("LAN"), a wide area network ("WAN"), the Internet, a cable network, a satellite network, a landline phone network, a cellular phone network, and the like. The devices 110 may vary in terms of form factor, portability, general-purpose computing capability, communication capability, and so forth. The identifier of the devices 110 may comprise an Internet Protocol ("IP") address, a cell phone electronic serial number ("ESN"), a physical phone number (if the device 110 comprises a physical phone), or the like.

One embodiment of a voice terminal device 110 may be an Internet Protocol ("IP") desk phone 504, which has a medium form factor, limited portability, little if any computing capability, and as a physical phone is dedicated and highly optimized for voice communication. In the present context, the desk phone 504 might typically comprise a second device 110-2, as the preferred device when paired in close proximity with a more portable first device 110-1 that is less optimized for voice communication.

One embodiment of a non-dedicated voice terminal device 110-1 may be a notebook computer 506 with a virtual phone capability, which has a medium form factor, moderate portability, the versatility of a computer 400, but as a virtual phone may not provide the higher quality user experience of a physical phone. Nevertheless, the greater portability of the notebook 506 as the first device 110-1 makes it more likely to be accessible to the user when out of close proximity with a less portable device 110-2 such as the desk phone 504.

Another embodiment of a device 110 may be a handheld 508 such as a cell phone 508A or a personal digital assistant ("PDA") 508B, which has a smaller form factor and higher portability than the other devices 110. The cell phone 508A has some of the quality characteristics of the desk phone 504, and the PDA has some of the versatility characteristics of the notebook computer 506 as a computer 400, although compromises may likely be made in order to achieve the higher portability of a handheld 508. At the other end of the spectrum, a desktop computer 510 has very low portability but perhaps greater versatility as a computer 400 than the notebook computer 506.

Figure 6:
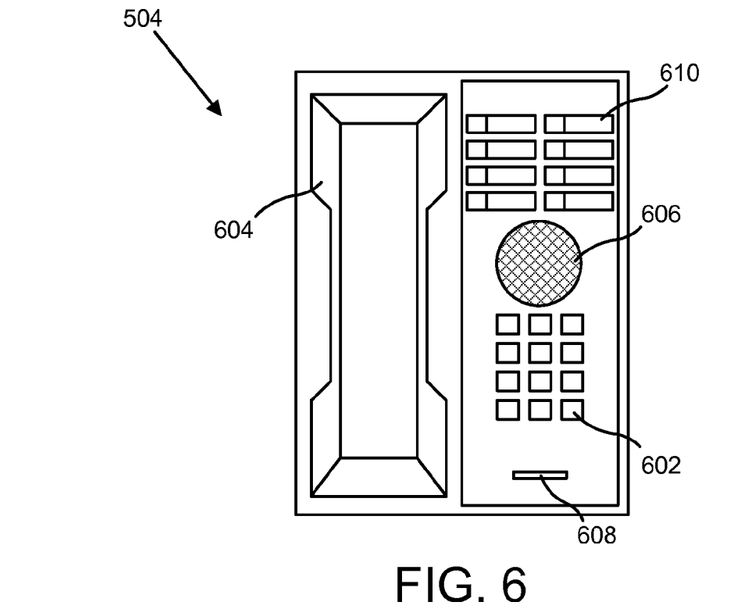
FIG. 6 illustrates an Internet Protocol ("IP") desk phone.

FIG. 6 illustrates the IP desk phone 504. It may comprise a phone keypad 602 and handset 604 for ergonomic comfort. A built-in speaker 606 and built-in microphone 608 may be provided for hands-free operation. One-touch controls 610 for speed-dialing or other special functions may be provided to further enhance the quality of the user experience.

Figure 7:
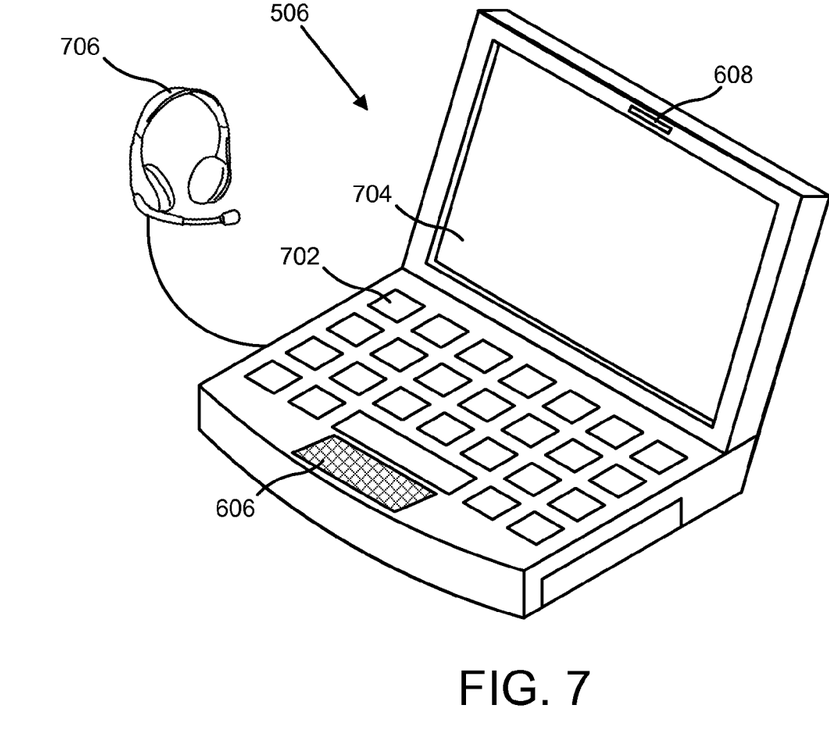
FIG. 7 illustrates a notebook computer equipped to provide a virtual phone capability.

FIG. 7 illustrates the notebook computer 506 equipped to provide a virtual phone capability Like the desk phone 504, the notebook 506 may comprise a built-in speaker 606 and built-in microphone 608. Rather than a keypad 602, the notebook 506 has a keyboard 702 and a built-in screen 704, which may provide additional desirable features, such as one-click calling, but may also obscure the basic and familiar functionality of a traditional phone due to added complexity. A headset 706 may be provided greater privacy and audio quality, similar to the handset 604, although perhaps less readily accessible for short, infrequent calls. A desk phone 504 may also provide support for a headset 706, combining some of the benefits of a handset 604 with the hands-free operation of a headset 706.

Figure 8A:
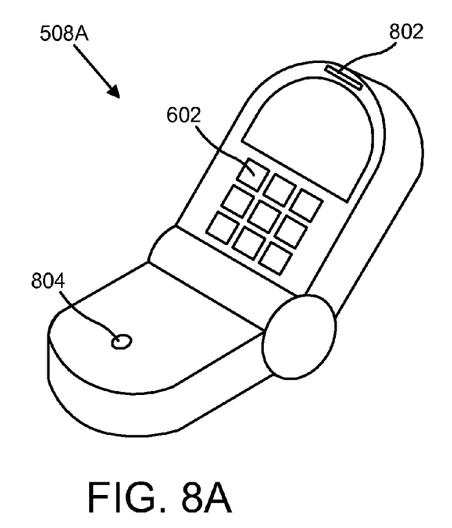
FIG. 8A illustrates a cell phone.

FIG. 8A illustrates the cell phone 508A. Like the desk phone 504, it has a keypad 602. A built in earpiece 802 and mouthpiece 804 allow it to function similar to a handset 604 when unfolded into the open position. It sacrifices the more advanced features of the desk phone for the sake of greater portability, and also may be less suitable for hands-free operation, unless equipped with a headset 706 or able to provide sufficient audio volume through the earpiece 802 in a standalone speakerphone mode of operation.

Figure 8B:
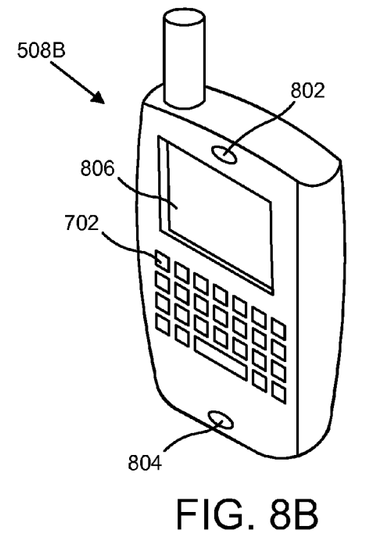
FIG. 8B illustrates a personal digital assistant ("PDA") comprising a smart phone.

FIG. 8B illustrates the PDA 508B, comprising a smart phone. Like the cell phone 508A, it has an earpiece 802 and mouthpiece 804, although it may not be quite as compact or ergonomically shaped. However, the keyboard 702 and touchscreen 806 give it a level of versatility approaching that of the notebook 506, with greater portability. It essentially represents a hybrid of the cell phone 508A and the notebook 506, and could therefore theoretically function as either a physical phone or a virtual phone.

Figure 9:
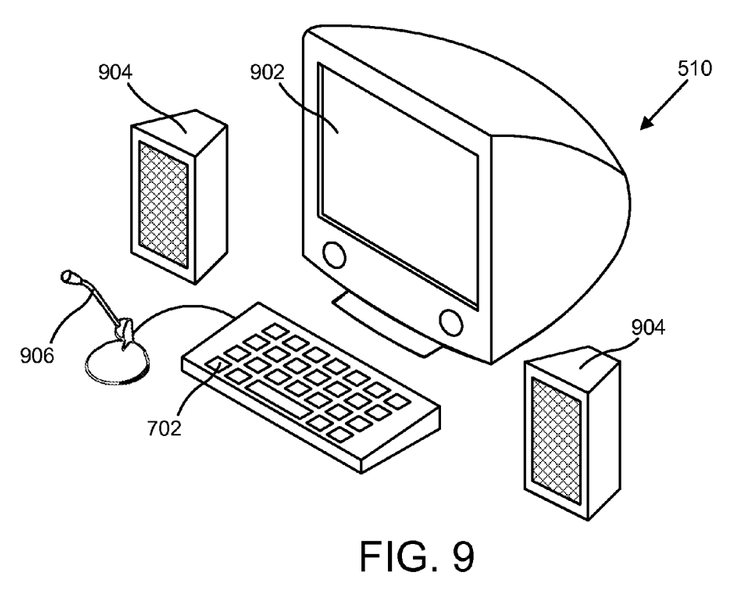
FIG. 9 illustrates a desktop computer equipped to provide a virtual phone capability.

FIG. 9 illustrates the desktop computer 510 equipped to provide a virtual phone capability. Similar to the notebook computer 506 it has a keyboard 702, with a full-size monitor 902 that may be larger than the screen 704. It may also have speakers 906 and a microphone 906 for better audio quality, although the headset 706 could also be used for greater privacy and space savings. While the notebook computer 506 may also be able to support the speakers 904 and microphone 906, that would compromise its portability. However, a notebook computer 506 could in fact be used as a replacement for a desktop computer 510.

Figure 10:
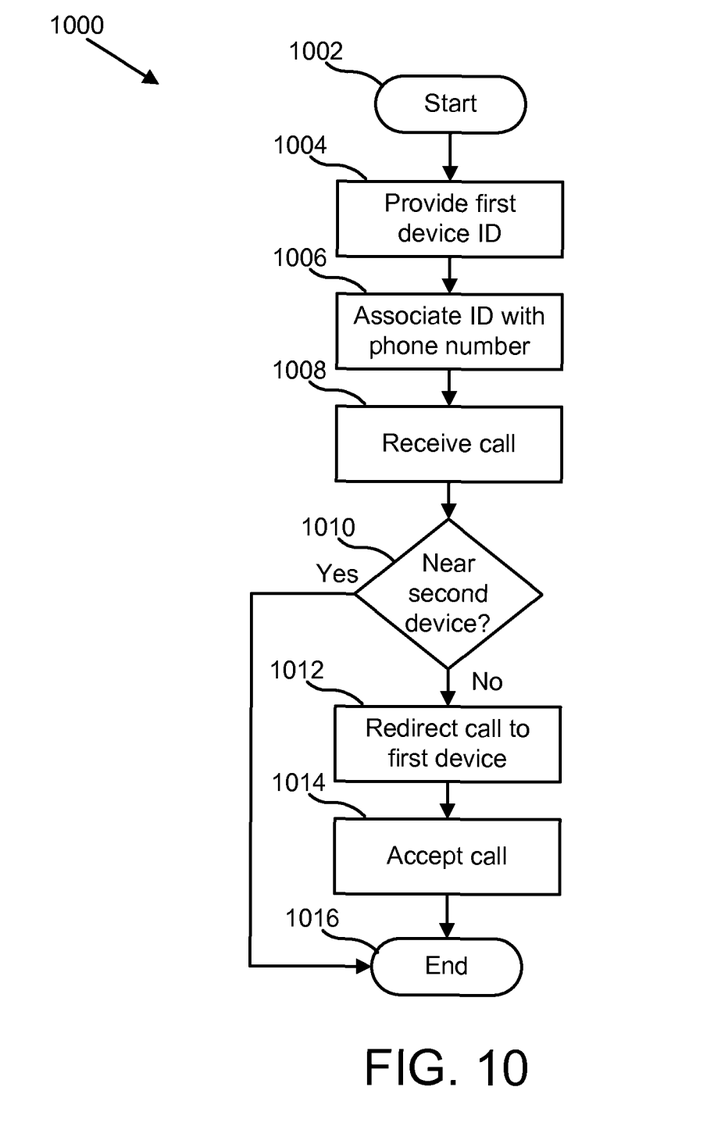
FIG. 10 is a schematic flow chart diagram illustrating one embodiment of a method for digital voice call redirection.

FIG. 10 is a schematic flow chart diagram illustrating one embodiment of a method 1000 for digital voice call redirection. The method 1000 starts 1002 and the address module 202 provides 1004 a first identifier of a first device 110-1, such as a notebook computer 506, to the configuration module 106. The configuration module 106 associates 1006 the first identifier with a phone number, the phone number also being associated with a second identifier of a second device 110-2, such as an IP desk phone 504. A digital voice call to any one of a plurality of devices associated with the phone number is received 1008 by the routing module 108 and the location module 204 makes a determination 1010 as to whether the first device 110-1 is within a predefined proximity to the second device 110-2. If so, the method 1000 ends 1016. If not, the routing module 108 redirects 1012 the call to the first device 110-1 using the first identifier. The call module 206 accepts 1014 the call and the method 1000 ends 1016.

Figure 11:
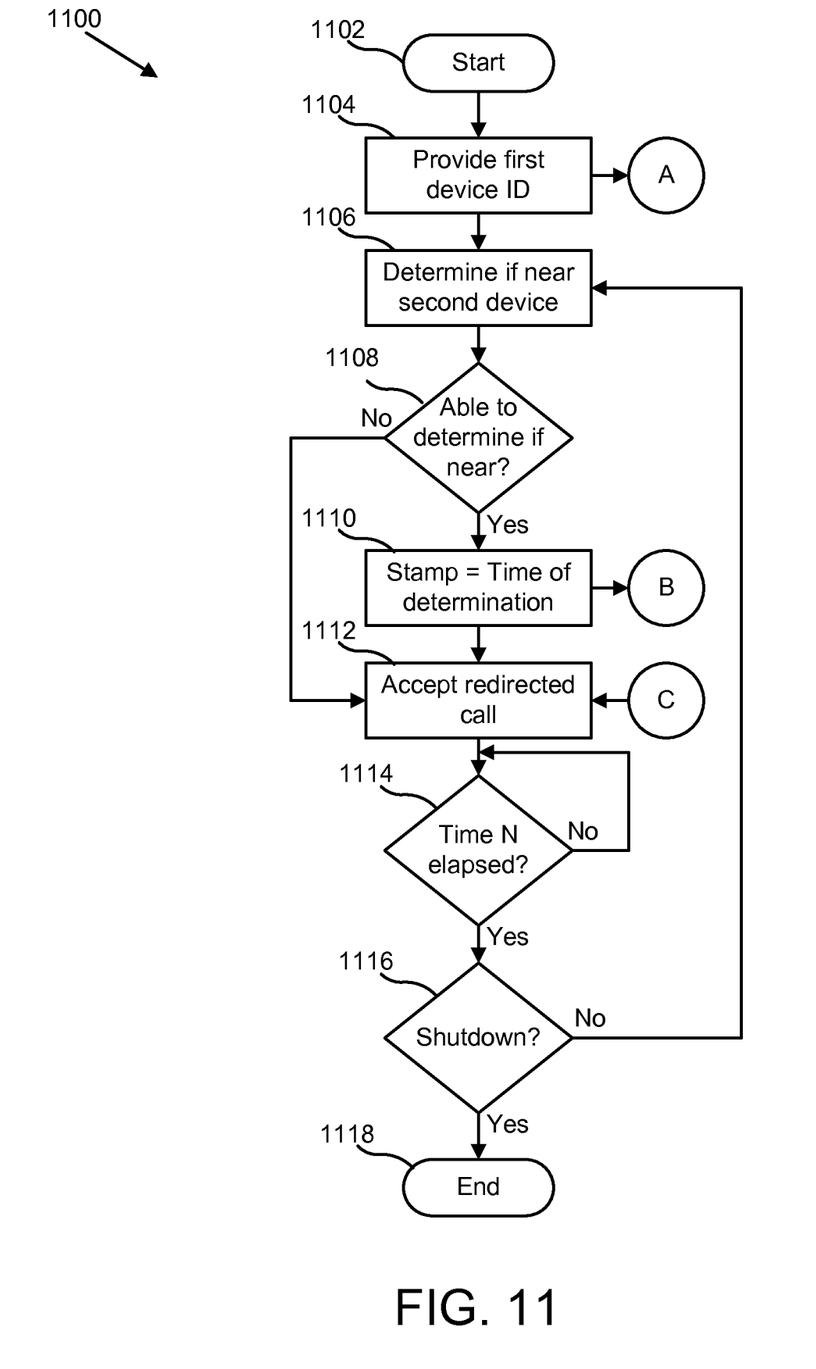
FIG. 11 is a more detailed schematic flow chart diagram illustrating one embodiment of a method of operation of the digital voice call redirection apparatus.

FIG. 11 is a more detailed schematic flow chart diagram illustrating one embodiment of a method 1100 of operation of the apparatus 104. The method 1100 starts 1102 and the address module 202 provides 1104 a first identifier of a first device 110-1 to the configuration module 106 via node A to method 1200 (FIG. 12) as described below. The location module 204 makes a determination 1106 as to whether the first device 110-1 is within a predefined proximity to the second device 110-2. If the determination is successful 1108 then it is time-stamped 1110 and provided to the routing module 108 via node B to method 1200. In either case, the call module 206 may accept 1112 any redirected call from the routing module 108 via node C from method 1200. The method 1100 then waits until a predefined time interval N has lapsed 1114 and repeats the foregoing steps starting with a fresh determination 1106 of proximity, unless the first device 110-1 is shut down 1116 or otherwise becomes non-operational, in which case the method 1100 ends 1118.

Figure 12:
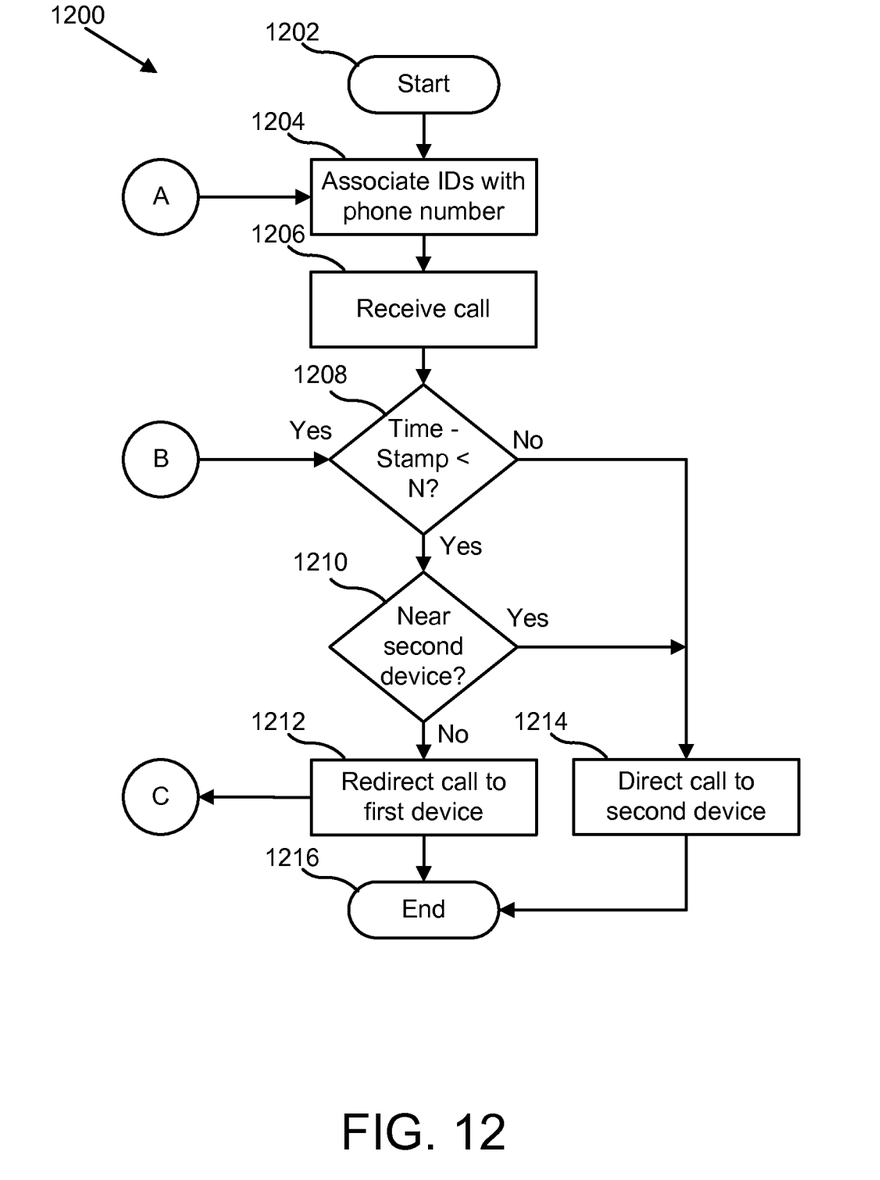
FIG. 12 is a more detailed schematic flow chart diagram illustrating one embodiment of a method of operation of the digital voice call redirection subsystem.

FIG. 12 is a schematic flow chart diagram illustrating one embodiment of a method 1200 of operation of the subsystem 102. The method 1200 begins 1202 and the configuration module 106 associates 1204 the phone number with the first identifier of the first device 110-1 in the manner provided via node A from method 1100 (FIG. 11) and with the second identifier of the second device 110-2 in a similar manner. A digital voice call to any one of a plurality of devices associated with the phone number is received 1206 by the routing module 108. If the current time is within 1208 the predefined time interval N of the time stamp as provided by the location module 204 via node B from method 1100, and the time-stamped determination of proximity indicates that the first device 110-1 is not near 1210 the second device 110-2, then the call is redirected 1212 to the call module 206 of the first device 110-1 via node C to method 1100. If neither of the foregoing conditions are met, then the call is directed 1214 to the second device 110-2 instead. Note that if the first device 110-1 is non-operational or the determination of proximity is unsuccessful for any reason, no time-stamped information will be received via node B from method 1100, and the call will be directed 1214 to the second device 110-2 by default. In either case, the method 1200 then ends 1216.

The present apparatus, system and method may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an address module which provides a first identifier of a first voice terminal device to a configuration module to be associated with a phone number, the same phone number also being associated with a second identifier of a second voice terminal device, wherein each identifiers is unique and does not comprise nor is associated with a different phone number;
a location module which makes a determination as to whether the first device is within a predefined proximity to the second device; and
a call module which accepts a digital voice call to any one of a plurality of devices associated with the same phone number, the call having been redirected by a routing module to the first device using the first identifier when the first device is not within the predefined proximity to the second device, the call otherwise being directed to the second device by default,
wherein the address module, the configuration module, the location module, the call module, and the routing module comprise one or more of logic hardware and executable code, the executable code stored on one or more non-transitory computer-readable media.

2. The apparatus of claim 1, wherein the predefined proximity comprises connectivity over a personal area network ("PAN").

3. The apparatus of claim 2, wherein the PAN is wireless, such that the predefined proximity comprises being within transmission range.

4. A system comprising:
a configuration module which associates a phone number with a first identifier of a first voice terminal device provided by an address module, the same phone number also being associated with a second identifier of a second voice terminal device, wherein each identifiers is unique and does not comprise nor is associated with a different phone number; and
a routing module which
receives a determination made by a location module as to whether the first device is within a predefined proximity to the second device, and
redirects a digital voice call to be accepted by a call module of the first device using the first identifier when the first device is not within the predefined proximity to the second device, the call otherwise being directed to the second device by default,
wherein the address module, the configuration module, the location module, the call module, and the routing module comprise one or more of logic hardware and executable code, the executable code stored on one or more non-transitory computer-readable media.

5. The system of claim 4, wherein the predefined proximity comprises being within transmission range over a wireless personal area network ("PAN").

6. The system of claim 5, wherein the wireless PAN is selected from the set of short-range wireless protocols consisting of Bluetooth, Wireless Fidelity ("WiFi"), Infrared Data Association ("IrDA"), Ultra Wide Band ("UWB"), Z-Wave, and ZigBee.

7. The system of claim 4, wherein the identifier comprises one of an internet protocol ("IP") address and a cell phone electronic serial number ("ESN").

8. The system of claim 4, wherein the first device is more portable than the second device in that a user changing location is more likely to take along the first device than the second device.

9. The system of claim 8, wherein the first device comprises one of a cell phone, a personal digital assistant ("PDA"), and a notebook computer, and the second device comprises one of a notebook computer, a desk phone, and a desktop computer.

10. The system of claim 4, wherein the first device comprises a computer with a virtual phone capability and the second device comprises a physical phone.

11. The system of claim 10, wherein the first device comprises one of a notebook computer and a PDA, and the second device comprises one of a desk phone and a cell phone.

12. The system of claim 10, wherein the location module is operationally coupled at least in part to the first device.

13. The system of claim 4, wherein the configuration module, the location module, and the routing module is operationally coupled at least in part to a digital voice server.

14. The system of claim 13, wherein the predefined proximity is determined using at least one of global positioning system ("GPS") technology and cellular location tracking.

15. The system of claim 4, wherein the first device and the second device comprise a pair selected from among a plurality of devices associated with the same phone number, and the determination is made repeatedly in a pair-wise iterative fashion, pairing a device selected by a prior determination with another device not yet rejected by another prior determination from among the plurality of devices, to make a subsequent determination until a single device emerges from among the plurality of devices to accept the call.

16. A computer program product comprising a non-transitory computer readable medium having computer executable code to perform operations comprising:
providing a first identifier of a first voice terminal device;
associating a phone number with the first identifier, the same phone number also being associated with a second identifier of a second voice terminal device, wherein each identifiers is unique and does not comprise nor is associated with a different phone number;
making a determination as to whether the first device is within a predefined proximity to the second device;
receiving a digital voice call to any one of a plurality of devices associated with the same phone number;
redirecting the call to the first device using the first identifier when the first device is not within the predefined proximity to the second device, the call otherwise being directed to the second device by default; and
accepting the call as redirected.

17. The computer program product of claim 16, wherein the predefined proximity comprises being within transmission range over a wireless personal area network ("PAN").

18. The computer program product of claim 16, further comprising assuming the first device to be within the predefined proximity to the second device if the determination is unsuccessful.

19. The computer program product of claim 18, wherein the determination is unsuccessful if it is not made within a predefined time interval before receiving the call.

20. A machine-implemented method comprising:
providing a first identifier of a first voice terminal device to be associated with a phone number, the same phone number also being associated with a second identifier of a second voice terminal device, wherein each identifiers is unique and does not comprise nor is associated with a different phone number;
making a determination as to whether the first device is within a predefined proximity to the second device; and
accepting a digital voice call received to the same phone number, the call having been redirected to the first device using the first identifier when the first device is not within the predefined proximity to the second device, the call otherwise being directed to the second device by default.

21. The method of claim 20, wherein the first device is more portable than the second device in that a user changing location is more likely to take along the first device than the second device.

22. The method of claim 20, wherein the first device comprises a computer with a virtual phone capability and the second device comprises a physical phone.

23. The method of claim 20, wherein the predefined proximity comprises connectivity over a personal area network ("PAN").

24. The method of claim 20, further comprising assuming the first device to be within the predefined proximity to the second device if the determination is unsuccessful.

25. The method of claim 24, wherein the determination is unsuccessful if it is not made within a predefined time interval before receiving the call.

\* \* \* \* \*